I. D. GARLICK.
SELF ACTING APPARATUS FOR WEIGHING GRAIN AND MAKING A RECORD OF SAME.
No. 10,352. Patented Dec. 20, 1853.
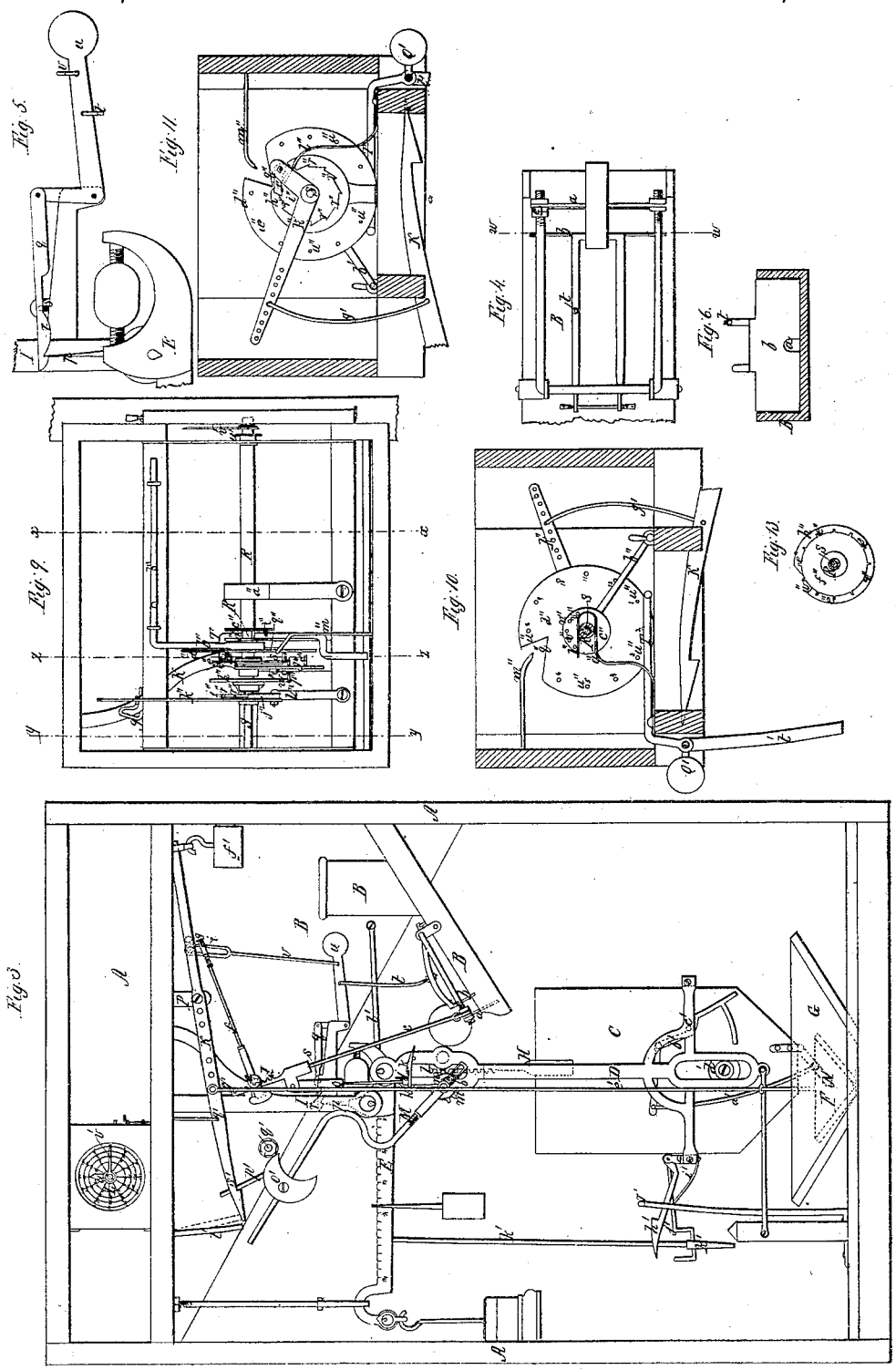

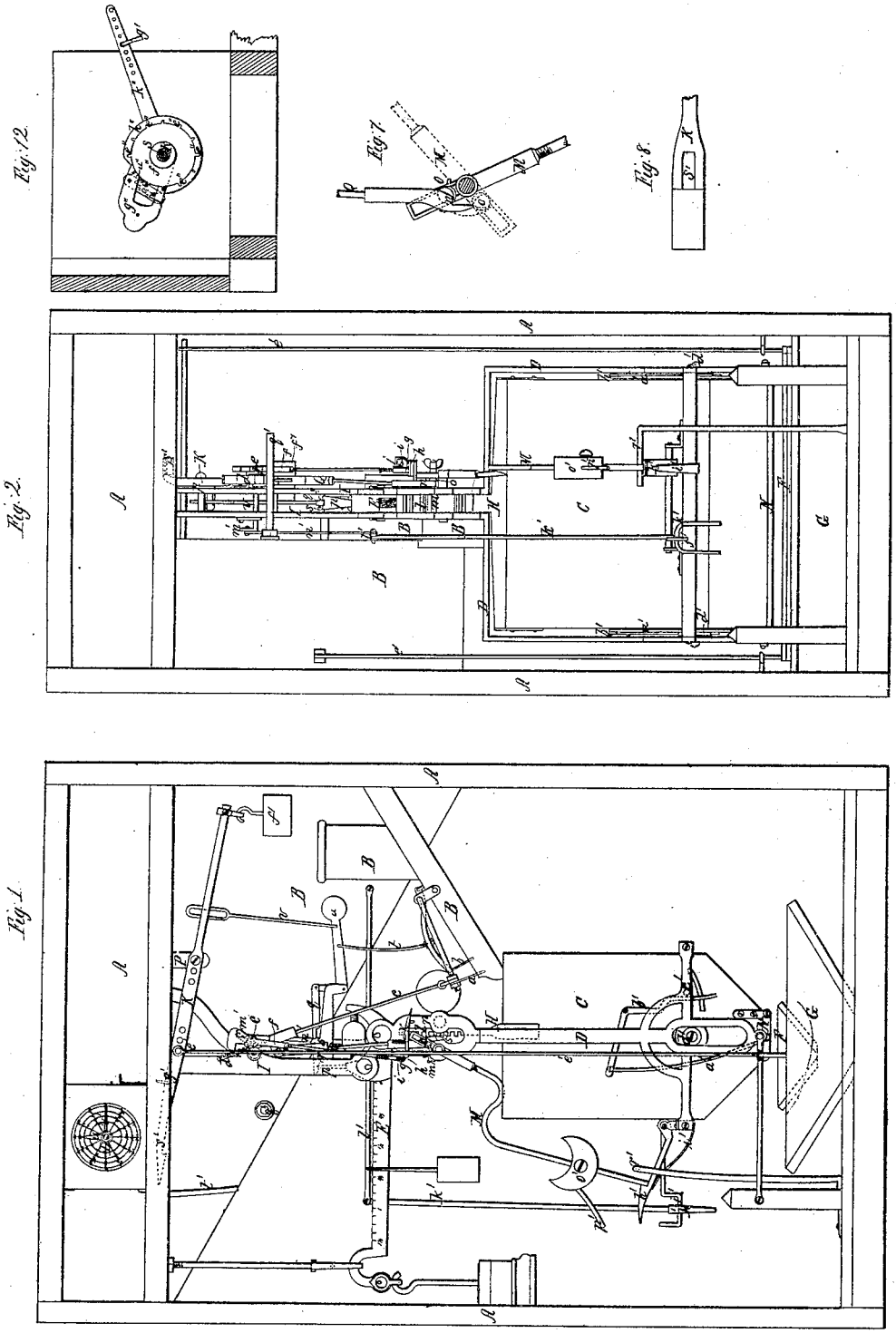

UNITED STATES PATENT OFFICE.

ISAAC D. GARLICK, OF LYONS, NEW YORK.

SELF-ACTING MACHINE FOR WEIGHING GRAIN.

Specification of Letters Patent No. 10,352, dated December 20, 1853.

*To all whom it may concern:*

Be it known that I, ISAAC D. GARLICK, of Lyons, in the county of Wayne and State of New York, have invented a new and Improved Self-Acting Apparatus for Weighing Grain and Making a Record of the Same; and I do hereby declare that the following is a full and exact description thereof, reference being had to the accompanying drawings, making part of this specification, Figure 1 being a front elevation of the machine; Fig. 2, a side elevation thereof; Fig. 3, a front elevation with the parts shown in the position in which the grain is discharging from the weighing-box; Figs. 4, 5, 6, 7, and 8, views of parts detached; Fig. 9, plan of the registering apparatus; Fig. 10, vertical section of the same in the line $x\ x$ of Fig. 9; Fig. 11, vertical section in the line $y\ y$ of Fig. 9; Fig. 12, section in the line $z\ z$ of Fig. 9, and Fig. 13 view of a part detached.

Like letters designate corresponding parts in all the figures.

The apparatus is arranged in a suitable frame A, which is situated beneath the loft where the grain is stored. A steelyard E, by which the grain is weighed, is suspended by the hangers I, I, and supports with its shorter arm a weighing-box C, whose own weight, with that of its appendages, is exactly balanced by counterweights; and the weight is determined by a poise, in the ordinary way, for as large or as small quantities as desired. The grain is conveyed from the loft to the weighing-box through a spout B.

The weighing-box is suspended from the steelyard by the frame D, within which it slides perpendicularly, being kept in place by the guides $d'$, $d'$, and is supported by a bar H, that terminates in a rack $l$, gearing into a pinion $m$, on the said frame D. A lever M, is attached to the pivot of the pinion $m$, and is provided with an adjustable weight $o'$, sufficiently heavy to readily raise, by said rack and pinion, the weighing-box when empty, but so light that the smallest amount of grain desired to be weighed at one time in the weighing-box will suffice to overbalance and raise it, with the arm M. While the weighing-box is filling with the grain, the said lever M, is held down in the position shown in Fig. 1, by a catch $h'$, which vibrates on a pivot situated on the frame D, and is pressed upward by a spring $i'$, also attached to said frame. The weighing-box is thereby held at its highest position in the frame D, as seen in Figs. 1 and 2. But, when the quantity of grain, at which the machine is set to weigh at one time, has run into the weighing-box and is required to be discharged therefrom, the catch $h'$, is depressed, by means hereinafter to be described, sufficiently to set the lever M, free, which is thereupon immediately carried upward, till it strikes the stop $q'$, by the weight of the grain in the weighing-box, that consequently descends within its frame D, and in that movement opens its bottom lid N, to discharge the grain. The position of the apparatus at this moment is shown in Fig. 3. The lid N, is operated by means of a cam lever $b'$, to one arm of which is attached one end of a curved elastic connecting rod $a'$, whose lower end is attached to the end of said lid. The other arm of the lever $b'$, bears against a pin $c'$, projecting from the frame D, and is so situated and shaped that, when the weighing-box ascends, it is moved by said pin sufficiently to close the lid and to straighten the bent elastic rod $a'$, with such force as to prevent the pressure of grain upon the lid from opening it in the least; but that, when the weighing-box descends with a batch of grain, a depression in it shall be brought opposite the pin and thereby allow the lid to open and discharge the grain. I usually apply this arrangement to both ends of the weighing-box, as shown in Fig. 2.

The grain is discharged from the weighing-box into a suspended hopper F, and thence into a fixed hopper G, to be conveyed therefrom to wherever desired. The hopper F, is suspended by means of lines, or rods, $e'$, $e'$, from a bar passing through one arm of a lever K, which vibrates on a fulcrum at P. Upon the other arm of the lever is placed a weight $f'$, heavy enough to raise the opposite arm to the position shown in Fig. 1, when the hopper F, suspended therefrom, is empty; but, when filled with the grain discharged from the weighing-box, the loaded arm of the lever should be overbalanced, and its opposite arm be brought down to the position shown in Fig. 3. An aperture $s'$, (represented in Fig. 8,) in this end of the lever, receives a pin $p'$, as it thus descends, which projects from the loaded lever M, and retains said lever K, till all the grain is discharged from the weighing-box, and nearly so from the hopper F, or until the loaded arm of the lever K, is sufficient to raise the opposite arm thereof; at which moment the pin $p'$, is set free and allows the lever M, to descend and consequently raise the weighing-box to its original position, and close its lid N. The force of the descent of the lever M, is broken by the elastic stop $r'$.

The supply of grain to the weighing-box is regulated by means of two gates $a$, and $b$, in the spout B, the latter of which gates falls, when the weight of grain is almost but not quite sufficient to tip the steelyard, and closes the spout with the exception of a small aperture $a$, (Fig. 6,) through which a fine stream of grain flows till the exact weight is obtained in the weighing-box, at which moment the gate $a$, falls and completely closes the spout.

The object of cutting off the large stream just before the full weight of grain is obtained, and then allowing a small stream to run, it will be obvious, is to render the weighing more exact, since, if the large stream were allowed to continue till the steelyard should be raised, before the machine could act to close the gate $a$, the amount of grain received into the weighing box might exceed by several pounds the true weight, and considerable loss be thereby sustained. The arrangement and operation of these gates are in the following manner.

A pin $p$, projects perpendicularly from the steelyard at a point nearly over its pivot, and is formed to a knife edge at the top. A knee-shaped lever $u$, vibrates on a pivot at its angle, and has hinged to its vertical arm a catch $q$, which is provided with a notch in its free end that falls over the knife edge of the pin $p$. A rod $t$, connects the horizontal arm of the lever $u$, with the gate $b$, as shown in Figs. 1, 3, 4, and 5; and another rod $v$, extends from the same arm of the lever upward and terminates in a loop, or slot, which embraces a pin, or staple, on the loaded arm of the lever K, and is so arranged that the said arm of the lever K, in ascending, will raise the gate $b$, but will descend without moving said gate. The horizontal arm of the lever $u$, together with the valve $b$, should be heavy enough to draw back the pin $p$, and so tip the steelyard a short time before the weight of the grain in the weighing-box is sufficient to tip it. The catch $q$, rests upon a small bar $s$, and has formed upon its under side a cam projection $r$, which slides over said bar $s$, whereby the catch is raised, when drawn back in the act of tipping the steelyard, and is detached from the pin $p$, thus allowing the gate $b$, to fall and close the spout with the exception of the small aperture $a$, before described; and, at the same time, the steelyard descends, because the weight of the said gate and lever $u$, thus ceases to act on its beam before the grain in the weighing-box becomes sufficient to tip it.

The gate $a$, is connected, by a rod $c$, with a rack $d$, which passes between a roller and a small pinion, into which it gears, on the pivot $e$. An adjustable rod $f$, is attached, near one end, to the same pivot $e$, and terminates, at the other end, in a small pin $i$, projecting from it at right angles; and fits into a tubular shoe $g$, the said pin $i$, moving in a slot in the shoe, as shown in the drawings, while a coiled spring forces the shoe off the rod as far as the pin in the slot will permit, but pressure against the end of the shoe will force it farther upon the end of the rod. Under the rod a horizontal catch-plate is attached to the frame D, and has upon its upper surface two notches $h$, and $k$, either of which will hold the foot of the rod $f$, when the steelyard is down; but when it is raised, and consequently the frame D, and with it, the catch-plate, are depressed to a certain extent, either notch will become detached from the foot of the rod and allow it to escape. A wire $j$, projects upward from said catch-plate between the two notches, $h$ and $k$, and is bent to the form shown in Fig. 2, so that the pin $i$, will freely pass under its point, when the steelyard is down, but when raised, and the frame D, is thereby depressed and with it said wire, the pin $i$ will strike it and be held until the steelyard is again brought down. The gate $a$, is sufficiently loaded to cause it to fall and turn the pinion and rod $f$, on the pivot $e$, when the foot $g$ is set free from the last notch $k$.

While the grain is running into the weighing-box, the foot $g$, of the rod $f$, is held by the notch $h$, as shown in Fig. 1. But when the steelyard is first tipped by the valve $b$, and loaded lever $u$, said foot $g$, is set free from the notch $h$, and the pin $i$, is caught by the wire $j$; then, the catch $q$, having been set free from the pin $p$, the steelyard descends, setting free the pin $i$, from the wire J, and the shoe $g$, is again caught by the notch $k$. In a few moments the weight of the grain in the weighing-box becomes sufficient to raise the steelyard, and the shoe $g$, is again set free from the last notch $k$, allowing the gate $a$, to fall and entirely close the spout B. The pivot $e$, in this movement, makes a partial revolution carrying the rod $f$, to the position shown in Fig. 3; and also turns downward a small crank $m'$, which is attached to said pivot and is, when the gate $a$, is raised, pointed upward, as seen in Figs. 1, and 2. Said crank carries downward with it a rod $n'$, thereby depressing a lever $l'$, and rod $k'$, that also depresses a lever $j'$, attached to the pivot of the catch $h'$, whereby the latter is likewise depressed and sets the lever M free. The said lever is thereupon turned upward by the weight of the grain in the weighing-box, as hereinbefore described, and is held up till the grain is entirely discharged, by means of the lever K, as before set forth. As the loaded end of the lever K, rises, in the above movement, it lifts the valve $b$, by means of the rod $v$, and brings the notch of the catch $q$, again over the pin $p$, ready for the next weighing.

In the shorter end of the lever M, is a slot, within which a cam catch $o$, of the form shown in Fig. 7, is inserted and made adjustable therein. A rod Q, is suspended from the rack $d$, and has near its lower end a shoulder $n$, as seen in Fig. 7. While the weighing-box is filling with the grain, said shoulder just hangs over the edge of the catch $o$, but when the valve $a$ descends, it slides off and down beside said catch. But the lever M, immediately rises, and brings the catch again below said shoulder, as shown by the dotted lines in Fig. 7; so that, when all the grain has been discharged from the weighing-box, and the lever M is again set free and descends, said catch engages the shoulder $n$, and carries it upward with its rod Q, thereby raising the gate $a$, and bringing down the rod $f$, against the notch $h$; and also raising, by means of the crank $m'$, the lever $l'$, and rod $k'$, whereby the arm $j'$, and catch $h'$, are permitted to be raised by the spring $i'$, so as to detain the lever M, again. The cam catch $o$, is also disengaged, at this moment, from the shoulder $n$, by its opposite edge striking the rod Q, below said shoulder, and pressing it off. All the parts of the machine are, by these movements, brought back to the positions which they occupied while the weighing-box was filling, and are ready for another weighing. When the lever M, is raised, the catch $o$, should be some distance below the shoulder $n$, as seen by the dotted lines, Fig. 7, so that, when the said lever descends, the rod Q, and gate $a$, do not begin to be raised till the lid N, of the weighing-box is entirely closed; consequently the grain does not begin to run from the spout till the weighing-box is completely closed.

The apparatus for registering the number of weighings is operated by the vibrations of the lever K, with which it is connected by a rod $g'$. Its face L (Figs. 1 and 3), is marked with a series of concentric circles, divided into any number of equal parts; (say from ten to a hundred); the inner circle shows the number of weighings, and is marked with the simple numbers 1, 2, 3, &c., in order.

The other circles, being marked with certain multiples of the numbers of the inner circle, such as 5, 25, or 50 times, said numbers, in corresponding order, will show the number of bushels, or other measure, at any time weighed, by looking at the circle, which contains numbers just as many times, larger than those on the inner circle, as there are bushels or other measure at each weighing. Two hands $u'$, and $v'$, are attached to separate shafts R, S, in the same manner as in the common clock. The hand $v'$, upon the inner shaft S, indicates the single weighings by the divisions of the inner circle, and the hand $u'$, upon the shaft R, indicates, on the same circle, the number of revolutions of the hand $v'$; so that, in a simple manner, a very large number of weighings may be registered—sufficient for a whole day or more. A bent lever $k''$, is placed loose upon the shaft S, its long arm being secured to the rod $q'$, which connects it with the lever K, while its short arm is provided with a click $j''$, which fall, upon a ratchet wheel $i''$, firmly attached to said shaft S, and having as many notches $r''$, $r''$, &c., on its periphery as there are divisions in the circles of the register face. A spring catch $l''$, also works into the ratchet wheel to prevent its moving backward. At every time a batch of grain is weighed, and the lever K, descends, the long arm of the lever $k''$, is depressed and moves forward the ratchet wheel $i''$, one notch, and consequently the hand $v'$, one division of the circle on the face of the register. Upon the end of the outer shaft, or tube, R, is secured a circular disk $f''$, (Figs. 9, 12 and 13,) which has upon its periphery equidistant pins, or projections $e''$, $e''$, &c., equal in number to the number of divisions of the circles on the register face. A little distance from this disk is another circular disk $h''$, placed over the shaft S, and concentric, but not in contact with it, being attached to the frame of the apparatus. This disk is large enough to completely cover the disk $f''$, and its projections $e''$, $e''$, &c., but has a notch $w''$, of the form shown in Figs. 12 and 13, sinking as deep as the periphery of the disk $f''$. Between these two disks an arm $g''$, is attached to the shaft S. A small vibrating click, or arm $o''$, is hinged to said arm $g''$, and through it passes a small pin $p''$, one end of which extends by, and rests upon the disk $h''$, and the other end in like manner reaches by the disk $f''$. As the shaft S, and with it the arm $g''$, turns around, the disk $h''$, prevents the pin $p''$, from coming in contact with the projections $e''$, $e''$, &c., of the disk $f''$, till it falls into the notch $w''$; and then, in ascending from said notch, it strikes one of the projections $e''$, $e''$ &c., and moves the disk $f''$, and consequently the hand $u''$, forward one division of the register face. The pin $p''$, is then carried outside of the projections $e''$, $e''$ &c., until another revolution is made, and it falls into the notch $w''$, again; so that the hand $u'$, is moved only one division of the circle at each revolution of the hand $v'$. The shaft R, is kept from being accidentally moved, by means of a spring clasp $a''$, which holds it with sufficient force for that purpose, but not too great to prevent the pin $p''$, from moving it.

It will sometimes be desirable to weigh a certain number of times and then to stop the machine without requiring one to attend and watch it. For this purpose I make use of the following additional parts to the registering apparatus:

A circular disk $d''$, is placed loose upon the shaft R, and around a hub, with which it is provided, passes a sliding gage $b''$, whereby to adjust it along said shaft to any point desired. In a concentric circle near its periphery it is perforated with a series of equidistant holes $u''$, $u''$, &c., equal in number to the divisions of the circles on the register face. Into either of these holes a pin $s''$, attached to the revolving arm $g''$, is made to fit. Below said disk, a bent arm T, vibrates on a shaft, to which is attached a stop $t'$; said arm is counterbalanced by a weight $Q'$, which raises it into a notch $q''$, in the edge of the disk $d''$, when brought around opposite to it. When in this position, the stop $t'$, is brought over the end of the lever K, as shown by the dotted lines in Fig. 3; thus preventing the ascent of said lever, and consequently stopping the farther operation of the machine. An arm $m''$, in the form and position shown in the drawings, ordinarily serves to keep the disk $d''$, from revolving, by being placed in the notch $q''$; but when said disk is put in operation, it serves as an index to determine how to set the disk to stop the machine when desired. For this purpose, the holes $u''$, $u''$, &c., are numbered, as seen in Fig. 10, in such a manner that, when the index $m''$, is opposite a particular number, that number will denote how many weighings will be made before the arm T, will enter the notch $q''$, and stop the machine. When it is desired to stop the machine after a number of weighings less than the number of divisions of the circles on the register face, said disk $d''$, is turned around till the index $m''$, points to the figure denoting the number of weighings desired, and is then moved along its shaft, by the gage $b''$, till the pin $s''$, enters that hole $u''$, which is opposite it, and thus couples the disk to the shaft S. Therefore the disk will be carried around with the shaft S, till the arm T, enters its notch $q''$, and stops the machine. When the number of weighings desired exceeds the capability of the shaft S, the disk $d''$, is coupled to the shaft R, by means of a small disk $n''$, on the opposite end of its hub, which small disk is perforated, in the same manner as the large disk, with the same number of equidistant holes $v''$, $v''$, &c., that fit over a coupling pin $t''$, on a disk, or arm, $c''$, attached to said shaft R. By moving the disk $d''$, back till said pin $t''$, enters the proper hole $v''$, as determined by the index $m''$, it will be coupled to the shaft R, and stop the machine when the index $v'$, has made the given number of revolutions. When not in use, the disk $d''$, is held midway between the two coupling pins $s''$, and $t''$, and kept from revolving by the arm $m''$, as before described, and shown in the drawings.

Having thus fully described my self-acting machine for weighing grain, what I claim therein as new, and desire to secure by Letters Patent, is—

1. The auxiliary gate $b$, when combined with the loaded, bent lever $u$, and cam catch $q$, or their equivalent; which act upon the steelyard so as to lift it shortly before the weight of grain in the weighing-box becomes sufficient to raise it; substantially in the manner and for the purposes herein set forth.

2. I also claim suspending the weighing-box C, in the frame D, by means of the rack $l$, pinion $m$, and loaded lever M, whereby it is made to slide up and down within said frame, at each weighing, and to produce the movements substantially as herein described.

3. I also claim the arrangement and combination of the bent cam lever $b'$, the pin $c'$, on the frame D, and the curved elastic rod $a'$, connecting said lever with the lid N, for the purpose of opening the lid at each descent of the weighing-box, within the frame D, and again closing it by the ascent thereof, substantially in the manner herein set forth.

4. I also claim the suspended hopper F, in combination with the vibrating lever K, arranged substantially in the manner and for the purposes herein set forth.

5. I also claim the combination of the notches $h, k$, and catch wire $j$, with the elastic shoe $g$, and pin $i$, of the lever $f$, arranged in such a manner that said lever is successively set free from the notch $h$, catch $j$, and notch $k$, respectively by the ascent, descent and second ascent of the steelyard, substantially as herein set forth.

6. I also claim the adjustable cam catch $o$, arranged substantially as described, in combination with the shouldered rod Q, for the purpose herein set forth.

7. I also claim the slotted rod $v$, in combination with the vibratory lever K, when arranged in such a manner that the ascent of the lever will raise the gate $b$, and hook the catch $q$, over the pin $p$, of the steelyard, but will not disturb the gate in its descent, substantially as herein described.

8. I also claim the arrangement and combination of the adjustable notched and perforated disk $d''$, the coupling pins $s''$, and $t''$, index $m''$, arm T, and stop $t'$, substantially in the manner and for the purposes herein set forth.

The above specification of my apparatus for weighing grain and making a record of the same, signed this 8th day of February 1853.

ISAAC D. GARLICK.

Witnesses:
 Z. C. ROBBINS,
 J. S. BROWN.